UNITED STATES PATENT OFFICE.

GEORGE BRUCKER, OF NEW YORK, N. Y.

NICKEL-PLATING FLUID.

SPECIFICATION forming part of Letters Patent No. 242,263, dated May 31, 1881.

Application filed March 28, 1881. (No specimens.)

*To all whom it may concern:*

Be it known that I, GEORGE BRUCKER, of the city, county, and State of New York, have invented a new and Improved Nickel-Plating Fluid, of which the following is a specification.

My composition consists of the following ingredients: saturated solution of pure nickel in nitric acid and water, hyposulphite of soda, cream of tartar. The proportions of the ingredients of the compound are as follows: to one hundred parts of the nickel solution I add about three parts of hyposulphite of soda and one part of cream of tartar, the latter being merely for the purpose of clearing the solution.

Having thus described my invention, I claim as new and desire to secure by Letters Patent—

A nickel-plating fluid composed of a saturated solution of pure nickel in nitric acid, and of hyposulphite of soda and cream of tartar, as set forth.

GEORGE BRUCKER.

Witnesses:
OSCAR F. GUNZ,
C. SEDGWICK.